Patented Oct. 12, 1926.

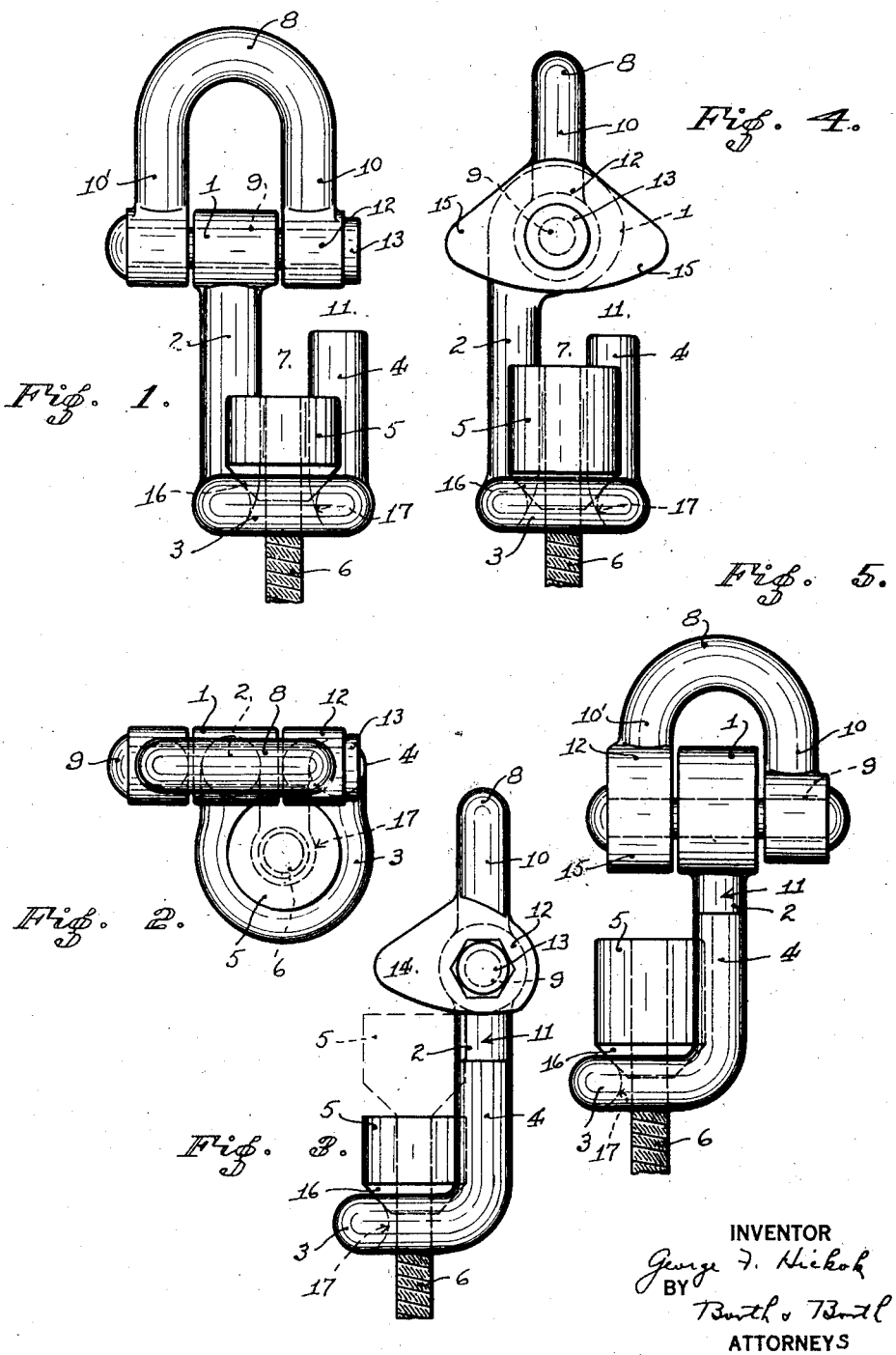

1,602,611

UNITED STATES PATENT OFFICE.

GEORGE F. HICKOK, OF SAN FRANCISCO, CALIFORNIA.

SAFETY HOOK.

Application filed December 29, 1925. Serial No. 78,082.

My invention relates to the class of safety hooks of the type particularly adapted for securing and attaching cables in logging, hoisting, or other similar operations, and constitutes an improvement upon the safety-hook forming the subject matter of my co-pending application for United States Letters Patent, Serial Number 39,936, filed June 27th, 1925, which said application has eventuated in Patent No. 1,570,149, dated January 19th, 1926.

The principal object of my present invention is to provide a simple, strong and inexpensive hook which cannot readily become detached accidentally from the cable when in use, but which can be easily and quickly attached to or detached from the cable, when desired, by the operator. A secondary object is to provide in a hook adapted for separable engagement with the terminal ferrule of a cable, means for limiting the backing away of the ferrule from the hook when the cable becomes slack. A still further object is to provide an improved form of seat between the ferrule and the hook, by which wear and breakage of the cable, in the region of attachment of the hook, are minimized. Other objects and advantages will become apparent from the following specification, which should be read with the understanding that the form, proportion, and arrangement of the several parts of my safety hook may be varied, within the limits of the claims hereto appended, without departing from the spirit of the invention as set forth in said claims.

With this in view a preferred form of my invention, together with certain modifications thereof, will now be fully described with reference to the accompanying drawings, wherein—

Fig. 1 is a front elevation of a preferred form of safety hook embodying my invention.

Fig. 2 is a plan view thereof.

Fig. 3 is a side elevation of a modified form of my invention.

Fig. 4 is a front elevation of a second modification.

Fig. 5 is a side elevation of the form shown in Fig. 4.

My hook comprises two connected members. The lower, or body member is best formed from a single bar of metal, one end thereof being upset to form a head or eye 1, below which is a straight shank 2, and at the lower end of the shank is a U-shaped bight or bend 3 disposed at right angles thereto. The end portion of the bar is then bent upwardly to form a guard 4 spaced from and parallel with the shank 2. The bight or bend 3 is adapted to form a seat or socket for a ferrule 5 secured in the usual manner upon the end of a cable 6. The slot or space 7 between the shank 2 and the guard 4 is of sufficient width to permit the passage of the cable 6 through it.

The body is permanently and preferably pivotally associated with a clevis or connecting head 8 by a pin 9. The upper portion of said clevis may be of any suitable shape adapting it for attachment to a cable or other member, not shown. It is illustrated in the drawings as a simple U-shaped clevis, whose legs 10 and 10' are apertured to receive the pin 9. In all forms of the device, the lower end of the leg 10 is so positioned as to form, with the end of the guard 4, an entrance 11 to the slot 7, said entrance being disposed substantially at right angles to the length of said slot, and having a width no greater than that of said slot, as best shown in Fig. 1. The effect of this entrance, when so positioned and proportioned, is to require that the cable 6 be turned at right angles to its normal or seated position, (as shown) in order to enable it to pass through said entrance in attaching or detaching the hook. There is, therefore, very little chance of the hook becoming accidentally detached from the cable, as said cable is extremely unlikely to assume a position transverse to the length of the hook, even under conditions of extreme slack. At the same time, the hook can be quickly and easily detached from or attached to the cable when desired.

In the form of device shown in Figs. 1 and 2, the clevis leg 10 is provided with a simple enlarged end or eye 12 positioned above the end of the guard 4 to form the slot entrance 11, and the pin 9 may have a head 13 of sufficient size to form a part of the upper wall of said entrance, as shown. The eye 1 of the body in this form is turned with its axis transverse to the bight 3.

In the form shown in Fig. 3, the clevis and body are in the same relative positions as in the previously described form, the lower end 12 of the clevis leg 10 forming, with the opposite end of the guard 4, the slot entrance 11. The clevis end 12, however, is provided it one side with a cam-like extension 14, which partially over-lies the bight 3, and forms a stop against which the ferrule 5 strikes, under conditions of slack in the cable 6, so that only a very small amount of such slack will pass through the bight 3.

By thus limiting the upward movement of the cable 6 through the bight 3, I eliminate a source of trouble common in the use of hooks of this general type, viz, the snapping off of the ferrule. When, under conditions of extreme slack, the ferrule is backed away from the bight of the hook for a considerable distance, and when such slack is again taken up, the ferrule is suddenly stopped, by seating against the bight, and the blow thus received is often of sufficient force to snap the ferrule off the end of the cable. By restricting the backing of the ferrule away from the hook, by the stop 14, I reduce very greatly the force of the blow when the slack is again taken up.

In the form shown in Figs. 4 and 5, the eye 1 of the body is turned at right angles to its position in the previously described forms, that is, its axis is parallel to the bight 3 instead of transverse thereto. The lower end 12 of the clevis leg 10 is formed with a double cam-like extension 15, which not only serves as the upper wall of the slot entrance 11, as shown in Fig. 4, but also as a stop for the ferrule 5, as shown in Fig. 5. The operation of this form is the same as that of the form shown in Fig. 3.

In all the forms illustrated, the ferrule 5 is best formed with a tapered or conical lower end, as indicated at 16, which seats partly within the bight or bend 3, and said bend has an inwardly tapered or dished upper surface, as shown, forming a seat for the reception of said tapered ferrule end. This seat is preferably formed by making the shank 2, the bend 3, and the guard 4 from a bar of round stock, the rounded surface of which provides the dished seat for the tapered ferrule end 16. By this construction, the ferrule may have, in effect, a swivel motion upon its seat in the bend 3, thereby minimizing bending of the cable 6 at its point of attachment to said ferrule.

It is also of advantage to make the interior of the bend 3, as shown in dotted lines at 17, of considerably larger diameter than the cable 6, to prevent wear upon said cable by rubbing against the interior of the bend, and to give room for the swivel action of the ferrule 5 in its seat. By thus minimizing bending and wear of the cable at the point of its attachment with the hook, its effective life is considerably lengthened.

I claim:

1. A safety hook comprising a shank, an attaching member movably associated with one end thereof; a U-shaped bend at the other end of said shank, lying in a plane substantially perpendicular to the plane of said shank, one extremity of said bend being associated with the shank and the other extremity free thereof; and a guard member extending from the free extremity of said bend parallel with and spaced from the shank to form a slot leading into said bend, the entrance to said slot lying between the end of said guard member and said attaching member.

2. A safety hook comprising a shank, an attaching member movably associated with one end thereof; a U-shaped bend at the other end of said shank, lying in a plane substantially perpendicular to the plane of said shank, one extremity of said bend being associated with the shank and the other extremity free thereof; and a guard member extending from the free extremity of said bend parallel with and spaced from the shank to form a slot leading into said bend, the entrance to said slot lying between the end of said guard member and said attaching member, and said entrance having a width no greater than the width of said slot.

3. A safety hook comprising a shank, an attaching member movably associated with one end thereof; a U-shaped bend at the other end of said shank, lying in a plane substantially perpendicular to the plane of said shank, one extremity of said bend being associated with the shank and the other extremity free thereof; and a guard member extending from the free extremity of said bend parallel with and spaced from the shank to form a slot leading into said bend, the entrance to said slot lying between the end of said guard member and said attaching member, and said entrance being disposed substantially at right angles to the length of said slot.

4. A safety hook comprising a shank; a bifurcated attaching clevis pivotally associated with one end thereof; a U-shaped bend at the other end of said shank, lying in a plane substantially perpendicular to the plane of said shank, one extremity of said bend being associated with the shank and the other extremity free thereof; and a guard member extending from the free extremity of said bend parallel with and spaced from the shank to form a slot leading into said bend, the entrance to said slot lying between the end of said guard member and one extremity of said clevis.

5. A safety hook adapted for separable attachment to the terminal ferrule of a cable, said hook comprising a shank; a U-shaped bend at one end of said shank, lying in a plane substantially perpendicular to the plane of said shank and forming a seat for the ferrule, one extremity of said bend being associated with the shank and the other extremity free thereof; a guard member extending from the free extremity of said bend parallel with and spaced from the shank to form a slot leading into said bend; and an attaching member associated with the other end of the shank and over-lying said ferrule to limit the movement thereof.

6. A safety hook adapted for separable connection with a cable comprising a shank; a U-shaped bend at one end of said shank, lying in a plane substantially perpendicular to the plane of said shank and having a dished upper surface forming a seat, one extremity of said bend being associated with the shank and the other extremity free thereof; a guard member extending from the free extremity of said bend parallel with and spaced from the shank to form a slot leading into said bend; a ferrule permanently secured upon the cable and having a substantially conical lower end adapted to seat upon the dished upper surface of said bend; and an attaching member associated with the other end of said shank.

7. A safety hook adapted for separable attachment to the terminal ferrule of a cable, said hook comprising a shank; a V-shaped bend at one end of said shank lying in a plane substantially perpendicular to the plane of said shank and forming a seat for the ferrule, one extremity of said bend being associated with the shank and the other extremity free thereof; a guard member extending from the free extremity of said bend parallel with and spaced from the shank to form a slot leading into said bend; and an attaching member associated with the other end of the shank, said attaching member overlying and spaced from the guard member to form therewith an entrance to said slot and overlying said ferrule to limit the movement thereof.

In testimony whereof I have signed my name to this specification.

GEORGE F. HICKOK.